United States Patent [19]

Horinouchi et al.

[11] Patent Number: 5,068,072

[45] Date of Patent: Nov. 26, 1991

[54] ELECTRICALLY CONDUCTIVE ZIRCONIA-BASED SINTERED BODY AND PROCESS FOR THE PRODUCTION THEREOF

[75] Inventors: Kazuo Horinouchi, Niihama; Masahide Mouri; Isao Kameda, both of Tsukuba, all of Japan

[73] Assignee: Sumitomo Chemical Company, Limited, Osaka, Japan

[21] Appl. No.: 448,284

[22] Filed: Dec. 11, 1989

[30] Foreign Application Priority Data

Dec. 13, 1988 [JP] Japan ................................. 63-315752
Nov. 13, 1989 [JP] Japan ................................. 1-295242

[51] Int. Cl.$^5$ .............................................. C04B 35/48
[52] U.S. Cl. ...................................... 264/66; 264/65; 75/235; 75/244; 252/520; 501/96; 501/103
[58] Field of Search .................. 252/520; 501/96, 103; 75/235, 244; 264/65, 66

[56] References Cited

U.S. PATENT DOCUMENTS 3,669,695  6/1972  Iler et al. ................................ 501/96
4,626,517 12/1986  Watanabe et al. ....................... 501/96
4,626,518 12/1986  Watanabe et al. ..................... 501/104
4,753,902  6/1988  Ketcham ................................ 501/87

FOREIGN PATENT DOCUMENTS 0279102  8/1988  European Pat. Off. .
60-103078  6/1985  Japan .
61-122161  6/1986  Japan .
61-59266 12/1986  Japan .
62-138359  6/1987  Japan .
63-144167  6/1988  Japan .

OTHER PUBLICATIONS

Journal of Material Science, 14, (1979), pp. 59-65, K. C. Radford et al., "Zirconia Electrolyte Cells".
Kino Zairyo (Functional Material), No. 10, (1986), pp. 31-37.

*Primary Examiner*—William R. Dixon, Jr.
*Assistant Examiner*—Anthony J. Green
*Attorney, Agent, or Firm*—Stevens, Davis, Miller & Mosher

[57] ABSTRACT

The present invention relates to a zirconia-based sintered body comprising TiN, $TiO_2$ and $ZrO_2$ and having electric conductivity and a process for the production thereof. The present invention provides a zirconia-based sintered body which has, at normal temperature, a mechanical strength of not less than 50 kg/mm$^2$, a fracture toughness of not less than 4 MPam$^{\frac{1}{2}}$, a Vickers hardness of not less than 1,000 kg/mm$^2$ and a volume resistivity of not more than 1 $\Omega$cm, and which is sinterable under normal pressure at low temperature, and a process for the production thereof.

3 Claims, No Drawings

ELECTRICALLY CONDUCTIVE ZIRCONIA-BASED SINTERED BODY AND PROCESS FOR THE PRODUCTION THEREOF

BACKGROUND OF THE INVENTION

2. Field of the Invention

This invention relates to an electrically conductive zirconia-based sintered body and a process for the production thereof, i.e. a zirconia-based sintered body which is not only excellent in mechanical properties such as strength, toughness, hardness, etc., but also has electric conductivity even in a low temperature region, and a process for the production thereof.

2. Related Art

Improvement of zirconia-based sintered bodies for toughness and high-temperature strength has been conventionally studied in an attempt to use them in cutting tools and materials for internal combustion engines, and partial-stabilized zirconia with $Y_2O_3$, $MgO$ or $CeO_2$ has been recently developed. Due to technical limitations in manufacturing zirconia-based sintered bodies, however, all of the zirconia-based sintered bodies have simple shapes. For this reason, it is necessarily required to add a machining process to obtain a final product. Since, however, zirconia-based sintered bodies are insulating materials, they have a disadvantage that an electrical discharge machining method, which is excellent in machining efficiency, cannot be applied thereto at low temperature.

As a method for imparting zirconia with electric conductivity and making possible electrical discharge machining, there is known a method of incorporating an electrically conductive powder of TiC, TiN, etc., into a zirconia powder and sintering the mixture.

For example, Japanese Patent Publication No. 59266/1986 discloses a sintered body comprising $ZrO_2$ and TiN. Concerning allowable impurities, however, it describes the following: The amount of $SiO_2$ is up to 3%, that of $Fe_2O_3$ or $TiO_2$ is up to 0.5%, the total amount of impurities is up to 3%, and if impurities are contained in an amount exceeding these limits, densification is hampered and the resultant sintered body has poor toughness.

Further, Japanese Patent Kokai (Laid-Open) No. 103078/1985 discloses a sintered body with $Y_2O_3$ or MgO as a stabilizer containing a carbide. Japanese Patent Kokai (Laid-Open) No. 138359/1987 teaches that one of carbide, nitride and carbonitride of Group IVa, Va or VIa element of Periodic Table is incorporated into $ZrO_2$ as an electric conductivity-imparting agent and that 0.1 to 10% by weight, based on the agent, of oxide of an element identical with that of the agent is added for the purpose of improvement of sinterability, thermal conductivity and electrical conductivity.

However, these sintered bodies have difficulty in achieving electric conductivity without degrading toughness, hardness, mechanical strength, etc., which zirconia inherently has. It has been therefore desired to develop sintered bodies having good electric conductivity thereby to make electrical discharge machining possible at ordinary temperature and having excellent toughness, hardness, mechanical strength, etc.

Meanwhile, it has been recently reported to use $TiO_2$ as a stabilizer of zirconia.

For example, K. C. Radford, et al report that $TiO_2$ acts as a sintering aid for $Y_2O_3$-based zirconia (J. Mat. Sci., Vol. 14, p. 59 et seq., 1979).

Tsukuma studies the action of $TiO_2$ as a stabilizer for $TiO_2$-$Y_2O_3$-based transparent zirconia (Kino Zairyo; 10, 1986, pp. 31-37).

It is, however, reported that since $TiO_2$ stabilizes tetragonal system, it becomes difficult to cause stress-induced transformation with an increase in an amount of $TiO_2$, and strength and toughness are decreased.

On the other hand, Japanese Patent Kokai (Laid-Open) Nos. 122161/1986 and 144167/1988 describe that incorporation of TiO is effective to achieve high strength of zirconia-based sintered bodies.

However, these patent documents neither are concerned with zirconia-based sintered bodies having electric conductivity nor mention toughness relative to incorporation of $TiO_2$. Nor do they disclose how $TiO_2$ behaves in the presence of an electric conductivity-imparting agent.

The present inventors have set a purpose, as conditions required to process and use zirconia-based sintered bodies, in providing a zirconia-based sintered body having a mechanical strength of at least 50 kg/mm$_2$, having a fracture toughness value of not less than 4 MPam$^{\frac{1}{2}}$, a Vickers hardness of not less than 1,000 kg/mm$^2$ and a volume resistivity of not more than 1 $\Omega$cm, and having sinterability at normal pressure and low temperature, and process for the production thereof.

SUMMARY OF THE INVENTION

According to this invention, there are provided:

an electrically conductive zirconia-based sintered body comprising 50 to 10 vol. % of TiN and 50 to 90 vol. % of $TiO_2+ZrO_2$, in which the amount of $TiO_2$ is more than 10% by weight based on TiN and the amount of Ti of $TiO_2$ is in the range of $1.5<Ti\leq10$ in percentage by weight, and which has a flexural strength of not less than 50 kg/mm$^2$ and a fracture toughness of not less than 4 MPam$^{\frac{1}{2}}$, a process for the production of an electrically conductive zirconia-based sintered body, which comprises mixing a $ZrO_2$ powder, a TiN powder and a $TiO_2$ powder or mixing a $TiO_2$-containing $ZrO_2$ powder and a TiN powder such that the amount of TiN is 50 to 10 vol. %, that of $TiO_2+ZrO_2$ is 50 to 90 vol. %, that of $TiO_2$ is more than 10% by weight based on TiN and that of Ti of $TiO_2$ is in the range of $1.5<Ti\leq10$ in percentage by weight, shaping the mixture, and then sintering the shaped body in an inert atmosphere, an electrically conductive zirconia-based sintered body comprising 50 to 10 vol. % of TiN and 50 to 90 vol. % of $TiO_2+ZrO_2$, wherein the amount of Ti of $TiO_2$ is in the range of $0.3<Ti\leq10$ in percentage by weight, and 10 to 40% of crystalline phase of $ZrO_2$ in the sintered body is monoclinic, and a process for the production of an electrically conductive zirconia-based sintered body, which comprises mixing a $ZrO_2$ powder, a TiN powder and a $TiO_2$ powder, or mixing a $TiO_2$-containing $ZrO_2$ powder and a TiN powder such that the amount of TiN is 50 to 10 vol. %, that of $TiO_2+ZrO_2$ is 50 to 90 vol. %, and that of Ti of $TiO_2$ is in the range of $0.3<Ti\leq10$ in percentage by weight, shaping the mixture, sintering the shaped body in an inert atmosphere, and subjecting the resultant sintered body to heat treatment at a temperature lower than the sintering temperature.

DETAILED DESCRIPTION OF THE INVENTION

The zirconia-based sintered body of this invention is composed of a zirconia solid solution containing $TiO_2$, as Ti, in an amount, based on $TiO_2+ZrO_2$, in the range of $0.3 < Ti \leq 10$ in percentage by weight, preferably $1.5 \leq Ti \leq 10$ in percentage by weight, and TiN.

The amount of TiN in the sintered body is about 10 to 50% by volume, preferably about 20 to 35% by volume. Further, it is preferable that the amount of $TiO_2$ exceeds 10% by weight based on TiN.

When the amount of TiN in the sintered body is less than 10% by volume, it is difficult to achieve electric conductivity for a volume resistivity of not more than 1 $\Omega$cm necessary for electrical discharge machining. And when it exceeds 50% by volume, the sintered body has badly low strength.

When the amount of Ti in a solid solution formed of $ZrO_2$ and $TiO_2$ exceeds 10% by weight, there is formed $ZrTiO_4$ which deteriorates strength and toughness. On the other hand, when the amount of Ti is less than 0.3% by weight, improvement of strength and toughness cannot be expected. Further, when the amount of $TiO_2$ is 10% by weight based on TiN, or less, cracks sometimes occur after only sintering is carried out.

Concerning zirconium oxide suitable for this invention, it is desirable to use a powder of partially stabilized zirconia produced by incorporating a conventionally known stabilizer such as $Y_2O_3$, MgO, $CeO_2$, etc., since when an unstabilized zirconia powder is used, cracks may occur after sintering. These stabilizers can be used in such an amount that known partially stabilized zirconia or tetragonal polycrystalline zirconia can be obtained. For example, in general, $Y_2O_3$ is usable in an amount of about 2 to 5 mole % based on a $ZrO_2$ powder, MgO in an amount of about 8 to 10 mole %, and $CeO_2$ in an amount of about 6 to 12 mole %. These stabilizers can be naturally used in combination.

The sintered body of this invention can be produced by a process which comprises mixing a $ZrO_2$ powder, $TiO_2$ powder and TiN powder such that the amount of $TiO_2$ in a solid solution in a zirconia-based sintered body is not more than 10% by weight as Ti and the amount of TiN is 10 to 50% by volume based on a zirconia solid solution, shaping the mixture, and sintering the shaped body in an inert atmosphere. In order to produce a sintered body having higher strength and higher toughness, a further step is added which comprises subjecting the sintered body obtained above to heat treatment in an inert atmosphere.

A stabilizer such as $Y_2O_3$, etc., may be added to a $ZrO_2$ powder before the $ZrO_2$ powder, TiN powder and $TiO_2$ powder are mixed, or it may be naturally added when these powders are mixed.

Any known mixing method, if it can give a homogeneous mixture, is usable to mix the above materials, and there is no special limitation on the mixing method.

Further, known methods are usable as a shaping method, such as die press, isostatic press, hot press, injection molding, hot isostatic press, etc.

The sintering conditions differ depending upon materials. Usually, however, the sintering is carried out in an inert atmosphere of nitrogen, argon, etc., at about 1,350 to 1,650° C. for not less than 1 hour, preferably at about 1,400 to 1,600° C. for 1 to 5 hours.

In general, a sintered body obtained at this stage has a composition composed mainly of a tetragonal phase and cubic phase and containing not more than 15% by weight of a monoclinic phase.

Then, in this invention, the sintered body obtained above may be subjected to heat treatment some time or immediately after the sintering as required.

The heat treatment conditions differ depending upon a composition of a sintered body to be heat-treated. In general, however, the heat treatment is carried out in an inert gas atmosphere of nitrogen, argon, etc., at about 1,000 to 1,300° C. for not less than 1 hour, preferably at about 1,100 to 1,250° C. for 1 to 100 hours.

In the sintered body obtained by the above heat treatment, the proportion of the tetragonal phase and/or cubic phase is decreased, the amount of the monoclinic phase is increased at least by more than about 5% by weight, and in general, the proportion of the monoclinic phase in a crystalline phase is about 10 to 30% by weight. Thus, the sintered body has remarkably improved mechanical strength and fracture toughness without deterioration of electric conductivity as compared with sintered bodies subjected to no heat treatment.

In this invention, it is naturally possible to include substance other than $ZrO_2$, $TiO_2$ and TiN in such an amount that the effects of this invention are not hampered. Examples thereof include inorganic substances such as $Al_2O_3$, $Si_3N_4$, SiC, TiC, TiB, etc., and these substances are contained in an amount depending upon purpose, and in general, in an amount not exceeding about 20% by volume based on $ZrO_2$.

In the sintered bodies produced according to this invention, those which contain $TiO_2$ as Ti in the range of $1.5 < Ti \leq 10$ wt. % and are subjected to the above heat treatment have a mechanical strength of at least 60 kg/mm$^2$ and a fracture toughness value of not less than 6 MPaml/$\frac{1}{2}$ without deterioration of electric conductivity. Thus, such sintered bodies of this invention have higher applicability to use as shafts for micromotors, industrial cutters, etc., in which materials, per se, are required to have electric conductivity, or fields of cutting tools, internal combustion engine parts, etc., in which machinability is required. And at the same time, the process of this invention is very economical, since it makes it possible to obtain a sintered body by sintering a specified amounts of a zirconia powder, titanium oxide and titanium nitride powder in the presence of nitrogen, even without carrying out sintering at high temperature or under pressure as in a process using, as raw materials, NbC and TiC, or further using TiN without a specific amount of $TiO_2$.

In addition, in this invention, physical properties of sintered bodies were measured in the following methods.

Electric conductivity (volume specific resistivity):

Measurement was effected on a test piece taken from a sintered body by using a four-terminal microohmmeter at room temperature, and conductivity was calculated on the basis of measured value and test piece dimension.

Flexural strength (three-point bending test):

Measured according to JIS-R1601.

Fracture toughness value:

Measured according to SEPB (Single-Edge-Pre-cracked-Beam) method.

(Referential literature)

T. Nose and T. Fujii; J. Am. Ceram. Soc., 71(5)328-33 (1988).

Crystalline phase

Measured by X-ray diffraction. A test piece mirror-polished with a 1 μm diamond paste was subjected to X-ray diffraction, and a proportion of each of crystalline phases was calculated according to the following formula.

$$m/(t+c) = [I_m(111) + I_m(11\bar{1})]/[I_t(111) + I_c(111)]$$

$$c/t = I_c(200)/[I_t(200) + I_t(002)]$$

wherein m denotes monoclinic phase, t denotes tetragonal phase, c denotes cubic phase, $I_m$ denotes integral strength of monoclinic phase, $I_t$ denotes integral strength of tetragonal phase, and $I_c$ represents integral strength of cubic phase.

EXAMPLES 1-17

A commercially available zirconia powder having an average particle size of 0.5 μm (containing 3 mole % of $Y_2O_3$ and not more than 0.1% by weight of impurities, manufactured by Sumitomo Chemical Co., Ltd.), a titania powder (anatase-type, manufactured by Ishihara Sangyo K.K.) and a titanium nitride powder (product of 325 mesh under, manufactured by Nippon Shin Kinzoku K.K.) were formulated in proportions shown in Table 1, mixed and pulverized in a wet ball mill (containing an ethanol solvent), then dired, and milled to give a sintering material. The sintering material was preliminarily shaped in a die pressing machine, and then subjected to isostatic press under a pressure of not less than 1,500 kg/cm². The resultant shaped bodies were sintered in an electric furnace in a nitrogen atmosphere under conditions described in Table 1. Then, part of the sintered bodies were further heat-treated in the electric furnace in a nitrogen atmosphere under conditions described in Table 1. Table 1 shows data of physical properties measured on the sintered bodies and further heat-treated sintered bodies.

COMPARATIVE EXAMPLES 1-7

The procedure of Example 1 was repeated by using the same zirconia powder, titania powder and titanium nitride powder as those used in Example 1 except that the proportions thereof were shown in Table 2. Table 2 shows data of physical properties measured on sintered bodies and heat-treated sintered bodies obtained in these Examples.

For comparison, Table 2 also shows data of physical properties measured on commercially available $ZrO_2$-based electrically conductive zirconia sintered body containing $TiC-Y_2O_3$ and $ZrO_2$-based electrically conductive zirconia sintered body containing $NbC-Y_2O_3$ (which are all hot-press products).

TABLE 1

| Example | Additive ($TiO_2$) Amount[1] (wt %) | Electric conductivity-imparting material Amount[2] (wt %) | Sintering conditions (°C.) × time | Heat treatment conditions (°C.) × time | Density (g/cm²) | Volume specific resistivity (Ωcm) | Flexural strength (kg/mm²) |
|---|---|---|---|---|---|---|---|
| 1 | 4.5 | 28.5 | 1550° C. × 2 Hr | 1150° C. × 10 Hr | 5.70 | $2 \times 10^{-3}$ | 78 |
| 2 | 5.0 | 28.5 | 1550° C. × 2 Hr | 1200° C. × 10 Hr | 5.67 | $2 \times 10^{-3}$ | 77 |
| 3 | 6.7 | 28.5 | 1550° C. × 2 Hr | 1100° C. × 10 Hr | 5.66 | $2 \times 10^{-3}$ | 85 |
| 4 | 6.7 | 20.5 | 1550° C. × 2 Hr | 1200° C. × 10 Hr | 5.66 | $2 \times 10^{-3}$ | 95 |
| 5 | 6.7 | 28.5 | 1550° C. × 2 Hr | 1250° C. × 10 Hr | 5.66 | $2 \times 10^{-3}$ | 82 |
| 6 | 6.7 | 33.4 | 1550° C. × 2 Hr | 1200° C. × 10 Hr | 5.62 | $7 \times 10^{-4}$ | 91 |
| 7 | 6.7 | 23.7 | 1550° C. × 2 Hr | 1150° C. × 10 Hr | 5.61 | $1 \times 10^{-2}$ | 78 |
| 8 | 14.0 | 28.5 | 1550° C. × 2 Hr | 1200° C. × 10 Hr | 5.79 | $2 \times 10^{-3}$ | 88 |
| 9 | 10.0 | 47.0 | 1550° C. × 2 Hr | 1200° C. × 10 Hr | 5.57 | $1 \times 10^{-4}$ | 70 |
| 10 | 6.7 | 23.7 | 1450° C. × 2 Hr | 1200° C. × 10 Hr | 5.78 | $7 \times 10^{-3}$ | 103 |
| 11 | 6.7 | 23.7 | 1450° C. × 2 Hr | 0 | 5.79 | $6 \times 10^{-3}$ | 83 |
| 12 | 4.0 | 28.5 | 1550° C. × 2 Hr | 0 | 5.70 | $2 \times 10^{-3}$ | 65 |
| 13 | 5.0 | 28.5 | 1550° C. × 2 Hr | 0 | 5.67 | $2 \times 10^{-3}$ | 66 |
| 14 | 6.7 | 28.5 | 1550° C. × 2 Hr | 0 | 5.66 | $2 \times 10^{-3}$ | 67 |
| 15 | 6.7 | 33.4 | 1550° C. × 2 Hr | 0 | 5.62 | $7 \times 10^{-4}$ | 71 |
| 16 | 6.7 | 23.7 | 1550° C. × 2 Hr | 0 | 5.61 | $1 \times 10^{-2}$ | 58 |
| 17 | 2.5 | 23.7 | 1550° C. × 2 Hr | 1200° C. × 10 Hr | 5.86 | $6 \times 10^{-3}$ | 111 |

| Example | Hardness (kg/mm²) | Toughness (MPam½) | $ZrO_2$ Crystalline phase c + t (%) | $ZrO_2$ Crystalline phase m (%) | Ti[3] (wt %) | TiN[4] (Vol %) | $TiO_2$[5] (wt %) | $TiO_2$/TiN (wt %) |
|---|---|---|---|---|---|---|---|---|
| 1 | 1189 | 6.4 | 82 | 18 | 2.4 | 27 | 2.9 | 10.04 |
| 2 | 1153 | 6.9 | 80 | 20 | 3.0 | 27 | 3.6 | 12.54 |
| 3 | 1141 | 7.6 | 73 | 27 | 4.0 | 27 | 4.8 | 16.81 |
| 4 | 1180 | 8.2 | 78 | 22 | 4.0 | 27 | 4.8 | 16.81 |
| 5 | 1215 | 7.6 | 80 | 20 | 4.0 | 27 | 4.8 | 16.81 |
| 6 | 1195 | 8.3 | 70 | 30 | 4.0 | 32 | 4.4 | 13.36 |
| 7 | 1150 | 8.7 | 81 | 19 | 4.0 | 21 | 5.1 | 21.57 |
| 8 | 1250 | 6.0 | 90 | 10 | 8.4 | 27 | 10.0 | 35.12 |
| 9 | 1350 | 7.5 | 75 | 25 | 6.0 | 45 | 5.3 | 11.28 |
| 10 | 1224 | 6.5 | 75 | 25 | 4.0 | 21 | 5.1 | 21.57 |
| 11 | 1325 | 4.6 | 91 | 9 | 4.0 | 21 | 5.1 | 21.57 |
| 12 | 1248 | 5.7 | 92 | 8 | 2.4 | 27 | 2.9 | 10.04 |
| 13 | 1210 | 5.2 | 92 | 8 | 3.0 | 27 | 3.6 | 12.54 |
| 14 | 1293 | 4.1 | 94 | 6 | 4.0 | 27 | 4.8 | 16.81 |
| 15 | 1292 | 4.3 | 94 | 6 | 4.0 | 32 | 4.4 | 13.36 |
| 16 | 1254 | 4.9 | 94 | 6 | 4.0 | 21 | 5.1 | 21.57 |

TABLE 1-continued

| | | | | | | | | |
|---|---|---|---|---|---|---|---|---|
| 17 | 1321 | 5.0 | 83 | 17 | 1.5 | 21 | 1.9 | 8.05 |

TABLE 2

| Comparative Example | Additive (TiO$_2$) Amount[1] (wt %) | Electric conductivity-imparting material Amount[2] (wt %) | Sintering conditions (°C.) × time | Heat treatment conditions (°C.) × time | Physical properties of sintered body | | |
|---|---|---|---|---|---|---|---|
| | | | | | Density (g/cm$^2$) | Volume specific resistivity (Ωcm) | Flexural strength (kg/mm$^2$) |
| 1 | 0 | 26.9 | 1550° C. × 2 Hr | 0 | 5.75 | 2 × 10$^{-3}$ | 58 |
| 2 | 17.0 | 28.5 | 1550° C. × 2 Hr | 1150° C. × 10 Hr | 5.51 | 2 × 10$^{-3}$ | 69 |
| 3 | 20.0 | 28.5 | 1550° C. × 2 Hr | 1150° C. × 10 Hr | 5.46 | 2 × 10$^{-3}$ | 65 |
| 4 | 10.0 | 0 | 1550° C. × 2 Hr | 0 | 4.52 | ∞ | — |
| 5 | 10.0 | 51 | 1550° C. × 2 Hr | 0 | 5.54 | 9 × 10$^{-5}$ | 47 |
| 6 | 2.5 | 23.7 | 1550° C. × 2 Hr | 0 | 5.86 | 6 × 10$^{-3}$ | Cracks formed |
| 7 | Commercially available ZrO$_2$-based zirconia sintered body containing TiC—Y$_2$O$_3$ | | | | 5.86 | 5 × 10$^{-2}$ | 98 |
| 8 | Commercially available ZrO$_2$-based zirconia sintered body containing NbC—Y$_2$O$_3$ | | | | 6.6 | 6 × 10$^{-3}$ | 120 |

| Comparative Example | Hardness (kg/mm$^2$) | Toughness (MPam$^{\frac{1}{2}}$) | ZrO$_2$ Crystalline phase | | Composition in sintered body | | | |
|---|---|---|---|---|---|---|---|---|
| | | | c/t (%) | m (%) | Ti[3] (wt %) | TiN[4] (Vol %) | TiO$_2$[5] (wt %) | TiO$_2$/TiN (wt %) |
| 1 | 1207 | 3.8 | 97 | 3 | 0 | 25 | 0 | 0 |
| 2 | 1190 | 3.2 | 100 | 0 | 10.2 | 27 | 12.2 | 42.65 |
| 3 | 1130 | 3.0 | 100 | 0 | 12.0 | 27 | 14.3 | 50.18 |
| 4 | — | — | 42 | 58 | 6.0 | 0 | 10.0 | — |
| 5 | 1370 | 4.0 | 93 | 7 | 6.0 | 53 | 4.9 | 9.61 |
| 6 | Failed to measure | | 93 | 7 | 1.5 | 21 | 1.9 | 8.05 |
| 7 | 1380 | 7.0 | — | — | — | — | — | — |
| 8 | 1450 | 4.0 | — | — | — | — | — | — |

Note:
Numbers (in Tables) denote the following.
[1] Amount based on ZrO$_2$ (wt %)
[2] Amount based on ZrO$_2$ and TiO$_2$ in total (wt %)
[3] TiO$_2$ concentration in ZrO$_2$ solid solution
[4] Volume based on ZrO$_2$ (Vol %)
[5] Amount based on ZrO$_2$ + TiN in total (wt %)

What is claimed is:

1. A process for the production of an electrically conductive zirconia-based sintered body, which consists essentially of mixing a ZrO$_2$ powder, a TiN powder and a TiO$_2$ powder or mixing a TiO$_2$-containing ZrO$_2$ powder and a TiN powder such that the amount of TiN is 50 to 10 vol. %, that of TiO$_2$+ZrO$_2$ is 50 to 90 vol. %, and that of Ti of TiO$_2$ is in the range of $0.3 < Ti \leq 10$ in percentage by weight, shaping the mixture, then sintering the shaped body in an inert atmosphere from 1350° to 1650° C., and subjecting the resultant shaped body to heat treatment at a temperature from 1000° to 1300° C.

2. A process according to claim 1 wherein the heat treatment is carried out in an inert gas atmosphere at 1,000 to 1,300° C. for 1 to 100 hours.

3. A process according to claim 1 wherein the sintering is carried out in an inert gas atmosphere at 1,350 to 1,650° for 1 to 5 hours.